(12) United States Patent
Vieira et al.

(10) Patent No.: US 11,113,674 B2
(45) Date of Patent: Sep. 7, 2021

(54) METHOD AND USER DEVICE FOR MONITORING A USE CONDITION

(71) Applicant: Motorola Mobility LLC, Chicago, IL (US)

(72) Inventors: Danila Vieira, Jaguariúna (BR); Andre Luiz Silva Bazante, Campinas (BR); Edgar Kenji Tanaka, Campinas (BR); Rodrigo Barbosa Dias, Campinas (BR); Andre Luis Graziani, Jundiai (BR); Jéssica Caroline Dias Nascimento, Campinas (BR); Guilherme Furlan, Santa Bárbara d'Oeste (BR); Rosane Alencar do Santos, Manaus (BR); Luiz Augusto Lago de Oliveira Filho, Recife (BR); Andre Scalet Marangone, Indaiatuba (BR); Lucas Henrique Grizante, Mogi Guaçu (BR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/721,840

(22) Filed: Dec. 19, 2019

(65) Prior Publication Data
US 2021/0192471 A1    Jun. 24, 2021

(51) Int. Cl.
*G06Q 10/00* (2012.01)
*G06Q 10/06* (2012.01)
*H04M 1/02* (2006.01)

(52) U.S. Cl.
CPC ....... *G06Q 10/20* (2013.01); *G06Q 10/06311* (2013.01); *H04M 1/0202* (2013.01); *H04M 2250/12* (2013.01)

(58) Field of Classification Search
CPC ............ G06Q 10/20; G06Q 10/06311; H04M 1/0202; H04M 2250/12
See application file for complete search history.

(56) References Cited

U.S. PATENT DOCUMENTS

| 10,534,361 B2 * | 1/2020 | Smiley ............... G06Q 10/0635 |
| 2003/0016410 A1 * | 1/2003 | Zhou .................. H04Q 11/0062 398/5 |

(Continued)

OTHER PUBLICATIONS

Chigurupati et al., Predicting Hardware Failure Using Machine Learning, IEEExplore, 2016.

*Primary Examiner* — Lewis G West
(74) *Attorney, Agent, or Firm* — Loppnow & Chapa

(57) ABSTRACT

The present application provides a method and a user device for monitoring a use condition. The method includes determining a baseline level of performance for each of one or more elements of the device including a determined replacement threshold level. The method further includes running a diagnostic determining the current performance of at least some of the one or more elements for which a baseline level of performance has been determined, wherein the running of the diagnostic includes a diagnostic determination triggered by a detected non-standard use condition. The current performance of the at least some of the one or more elements is compared to the determined baseline level performance for the respective ones of the one or more elements of the user device. When the determined current performance of at least one of the one or more elements falls below the determined replacement threshold level, the user is notified of a need for service of the user device.

20 Claims, 6 Drawing Sheets

(56) References Cited

U.S. PATENT DOCUMENTS

| | | | |
|---|---|---|---|
| 2010/0001867 A1* | 1/2010 | Rodrigue | G01F 23/0069 340/618 |
| 2010/0085198 A1* | 4/2010 | Boss | G01F 23/0007 340/618 |
| 2011/0216358 A1* | 9/2011 | Katou | G06F 3/12 358/1.15 |
| 2014/0266713 A1* | 9/2014 | Sehgal | G16H 40/40 340/540 |
| 2014/0340218 A1* | 11/2014 | Sutherland | G08B 29/188 340/539.12 |
| 2015/0081136 A1* | 3/2015 | Sutherland | G08B 21/043 701/2 |
| 2015/0173669 A1* | 6/2015 | Simon | A61B 5/4076 600/595 |
| 2017/0049963 A1* | 2/2017 | Varsavsky | A61B 5/4839 |
| 2017/0185500 A1* | 6/2017 | Kreiner | H02J 7/0047 |
| 2017/0207926 A1* | 7/2017 | Gil | H04W 4/70 |
| 2017/0235622 A1* | 8/2017 | Boyapalle | G06F 11/3409 714/47.2 |
| 2018/0286510 A1* | 10/2018 | Kwan | G06Q 30/0633 |
| 2019/0039545 A1* | 2/2019 | Kumar | B60R 21/013 |
| 2020/0219529 A1* | 7/2020 | Gordon | G10L 15/22 |
| 2020/0268260 A1* | 8/2020 | Tran | A61B 5/0538 |
| 2020/0364588 A1* | 11/2020 | Knox | H04L 67/125 |

* cited by examiner

METHOD AND USER DEVICE FOR MONITORING A USE CONDITION

FIELD OF THE APPLICATION

The present disclosure relates generally to monitoring a condition of a user device, and more particularly, to the detection of a non-standard use condition which triggers the running a diagnostic of the user device, where the health of the device and the one or more elements of the device are monitored and managed.

BACKGROUND

Users interact with electronic devices under various circumstances and conditions. During the interaction with the device, there are instances in which the device may be mishandled. In such instances, the device may undergo stresses that the device is not typically expected to experience. For example, the device may be dropped from a height, which may produce an impact shock when the device comes to a sudden stop during a fall. It is further possible, that the device could be dropped into a substance, for example into a liquid such as water, which may expose the device and/or components thereof, to an operating environment that is less than ideal. During such instances, the operating integrity of the device could be affected, which can have an impact on the ability of the device to continue to function as intended. For example, immersion in a fluid like water containing ions may expose the electronic circuitry to alternate electrical current paths, which may expose some of the portions and/or elements to unintended voltages and/or currents, and/or may produce other disruptive effects. In other instances, the device may have been fortunate enough to have substantially avoided incurring any of the possible ill effects.

Even relatively careful users can have their devices being sometimes subjected to unintended use conditions, with the possibility that the device will sustain damaging effects. For example, a user may stand up after having forgotten that their device had been resting in their lap, causing the device to fall to the ground. In other instances, while using a device near a body or a pool of water, the device while being used might slip from the grasp of the user and fall into the water, and become at least partially submerged prior to being retrieved from the water. During such an at least partial immersion, it is possible that water may enter the device with the potential for unintended or unforeseen consequences.

After such an instance, it may not be immediately clear whether the device has sustained any damage, which could interfere with the ongoing performance of the device for its intended uses and/or may create uncertainties, and/or feelings of anxiety or worry, which result in the user feeling elevated levels of stress.

The present inventors have recognized that in such an instance, it may be beneficial to trigger the running of a diagnostic, which can determine and/or monitor the current performance of at least some of the one or more elements of the device. The determined current status can then be used to identify at least some instances in which service of the device may presently be desirable.

SUMMARY

The present application provides a method for monitoring a condition of a user device. The method includes determining a baseline level of performance for each of one or more elements of the device including a determined replacement threshold level. The method further includes running a diagnostic determining the current performance of at least some of the one or more elements for which a baseline level of performance has been determined, wherein the running of the diagnostic includes a diagnostic determination triggered by a detected non-standard use condition. The current performance of the at least some of the one or more elements is compared to the determined baseline level performance for the respective ones of the one or more elements of the user device. When the determined current performance of at least one of the one or more elements falls below the determined replacement threshold level, the user is notified of a need for service of the user device.

In at least one embodiment, the non-standard use condition can include a detected impact of the device against a surface. In at least another embodiment, the non-standard use condition can include a detected immersion in water.

In at least a further embodiment, determining a baseline level of performance can include a maintained performance history of at least some of the one or more elements. In some of these instances, the maintained performance history can be stored using blockchain technology.

In at least a still further embodiment, the method can further include communicating with the service center for managing the service of the user device.

The present application further provides a user device. The user device includes one or more sensors, and a controller. The controller includes a baseline level of performance determination module adapted for determining a baseline level of performance for each of one or more elements of the device including a determined replacement threshold level. The controller further includes a diagnostic module adapted for running a diagnostic determining the current performance of at least some of the one or more elements for which a baseline level of performance has been determined, wherein the running of the diagnostic includes a diagnostic determination triggered by a detected non-standard use condition by a non-standard use condition detection module. The controller still further includes a comparator module adapted for comparing the current performance of the at least some of the one or more elements to the determined baseline level performance for the respective ones of the one or more elements of the user device, and a user notification module adapted for notifying the user of a need for service of the user device, when the determined current performance of at least one of the one or more elements falls below the determined replacement threshold level.

These and other features, and advantages of the present disclosure are evident from the following description of one or more preferred embodiments, with reference to the accompanying drawings.

DETAILED DESCRIPTION OF THE PREFERRED EMBODIMENT(S)

Figure 1:
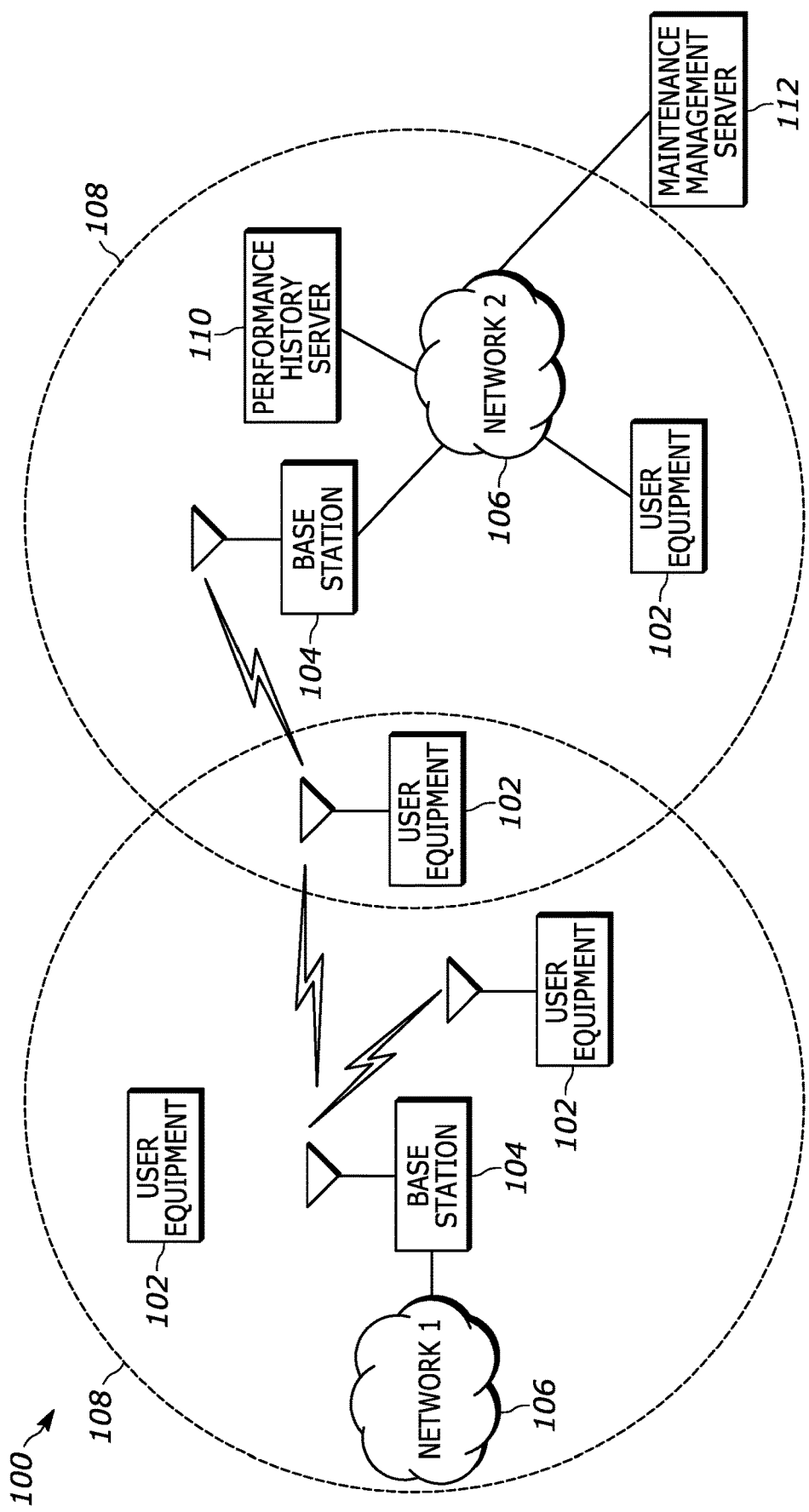
FIG. 1 is a block diagram of an exemplary network environment.

While the present invention is susceptible of embodiment in various forms, there is shown in the drawings and will hereinafter be described presently preferred embodiments with the understanding that the present disclosure is to be considered an exemplification and is not intended to limit the invention to the specific embodiments illustrated. One skilled in the art will hopefully appreciate that the elements in the drawings are illustrated for simplicity and clarity and have not necessarily been drawn to scale. For example, the dimensions of some of the elements in the drawings may be exaggerated relative to other elements with the intent to help improve understanding of the aspects of the embodiments being illustrated and described.

FIG. 1 illustrates a block diagram of an exemplary network environment 100. The exemplary network environment 100 can include one or more devices, such as user equipment 102, at least some of which might be communication devices and/or wireless communication devices, which can communicate directly with one another, or via one or more networks, each having an associated network infrastructure. For example, the network infrastructure can include one or more base stations 104, which in turn are coupled to other network elements, which correspond to one or more networks, and which are generally represented as clouds labeled network 106. The various base stations 104 can be associated with the same network or can be separately associated with different networks.

A base station 104 will generally have an expected associated area 108 of coverage, which defines the area over which wireless radio frequency signaling from the base station can generally reach. While the strength of wireless radio frequency signaling is generally affected by the range of transmission, within an expected area of coverage, terrain and/or other physical elements can impact the ability of the signaling to be perceived at particular locations within the expected area 108 of coverage. Depending upon the reception capabilities of the user equipment 102, the current signal strength of the signal being transmitted at a particular location will affect whether a particular user equipment 102 can send or receive data with a particular base station 104. As such, some networks 106 will make use of multiple geographically spaced apart base stations 104, to provide communication capabilities across a larger geographical area.

It is further possible that different base stations 104 can be more directly associated with different networks 106, which may interact with one another at different parts of the respective networks. The network(s) 106 can include any type of network that is capable of conveying signals between different associated elements of the network including the one or more user equipment 102.

In some instances, the user equipment 102 can generally be a wireless communication device that could take the form of a radio frequency cellular telephone. However, the user equipment 102 could also take the form of other types of devices that might or might not support wireless communication capabilities. For example, the different potential types of user equipment can include a tablet, a laptop computer, a desktop computer, a netbook, a cordless telephone, a selective call receiver, a gaming device, a personal digital assistant, as well as any other type of device that might be used to support desired functionality, such as various forms of wireless communication.

To the extent that wireless communications are supported, the various networks 106, base stations 104 and user equipment 102 could be associated with one or more different communication standards. A few examples of different communication standards that a particular network 106 could support include Global System for Mobile Communications (GSM) Code Division Multiple Access (CDMA), Orthogonal Frequency Division Multiple Access (OFDMA), Long Term Evolution (LTE), New Radio Access Technology (NR), Global Positioning System (GPS), Wi-Fi (IEEE 802.11), as well as various other communication standards. It is possible that each network and/or associated element could support one or more different communication standards. It is also possible that different networks 106 can support one or more of the same standards. It is still further possible that the user device could communicate with other user equipment more directly and/or with network elements via a wired connection, which could also make use of one or more communication protocols.

In addition, the user equipment 102, base stations 104 and networks 106, to the extent that wireless communications are supported, may utilize a number of additional forms of communication and communication techniques including beamforming, signal diversity, and simultaneous voice and data that enables the use of concurrent and/or simultaneous signal propagation. The user equipment 102, base stations 104 and networks may further utilize carrier aggregation, and/or dual connectivity, which can include the simultaneous use of multiple adjacent carriers, that each can allow for the use of a different wireless communication technology, that is respectively used in conjunction with one or more communication networks.

Through the interaction with the network and/or through a more direct form of communication, the user equipment 102, in some instances may interact with one or more servers, such as a performance history server 110 and/or a maintenance management server 112. Through the interaction with other elements such as other user equipment, and or network elements, such as the base station or servers, the user equipment 102 may benefit from resources and/or capabilities that are stored and/or managed separate from any particular device. However, it is possible that the desired resources and/or capabilities may be managed locally relative to a particular device.

As part of the general operation of the user device 102, the user device 102 may be capable of detecting instances in which the user device 102 is exposed to circumstances and/or use conditions, which may cause the device or portions thereof to experience a degradation to its ongoing performance. For example, some device interactions may result in damage to the user device. Typically, any usage that might expose all or portions of the device to more immediate damage and/or degradation could be considered as non-standard, whereby the usage is beyond what would more traditionally be expected under more normal operating conditions. Not all non-standard use conditions will result in corresponding damage or degradation of the ongoing operation of the device. However, it may not be readily apparent to the user as to whether the device after experiencing the non-standard use condition has experienced any corresponding damage and/or meaningful degradation of performance.

Upon detecting at least some forms of non-standard use conditions, the user device 102 might initiate an execution of a diagnostic determination, which can be used to help evaluate the current operating characteristics of the various elements of the device, in order to better determine whether any discernible damage has been identified that could result in the need for service of the device, so that the device will be better able to return to a state where it is operating as expected and/or intended.

Figure 2:
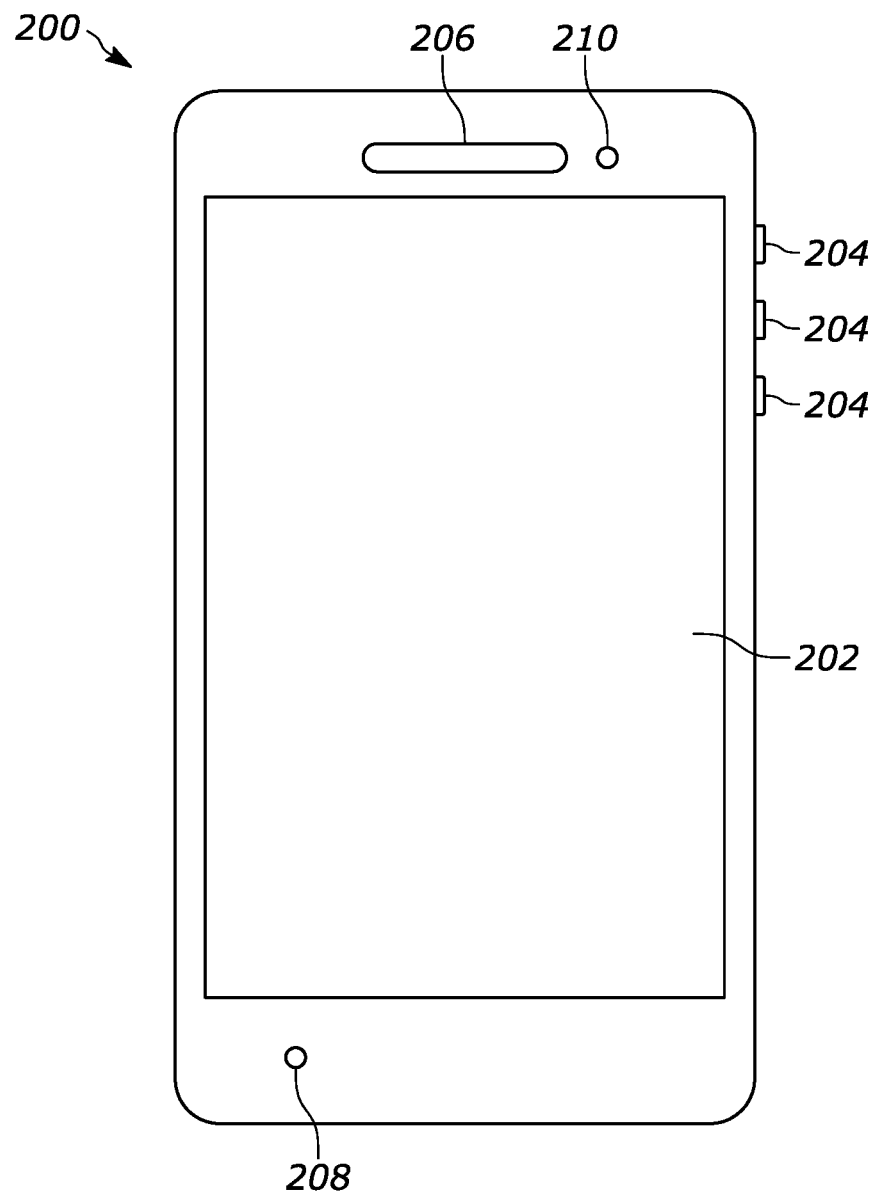
FIG. 2 is a front view of an exemplary user equipment in the form of a wireless communication device, such as a radio frequency radio telephone.

FIG. 2 illustrates a front view of an exemplary user equipment 102 in the form of a wireless communication device 200, such as a radio frequency radio telephone. In the illustrated embodiment, the radio frequency cellular telephone includes a display 202 which covers a large portion of the front facing. In at least some instances, the display can incorporate a touch sensitive matrix, that can help facilitate the detection of one or more user inputs relative to at least some portions of the display, including an interaction with visual elements being presented to the user via the display 202. In some instances, the visual elements could include an object with which the user can interact. In other instances, the visual elements can form part of a visual representation of a keyboard including one or more virtual keys and/or one or more buttons with which the user can interact and/or select for a simulated actuation. In addition to one or more virtual user actuatable buttons or keys, the device can include one or more physical user actuatable buttons 204. In the particular embodiment illustrated, the device has three such buttons located along the right side of the device.

The exemplary wireless communication device 200, illustrated in FIG. 2, additionally includes a speaker 206 and a microphone 208 in support of voice communications. The speaker 206 may additionally support the reproduction of an audio signal, which could be a stand-alone signal, such as for use in the playing of music, or can be part of a multimedia presentation, such as for use in the playing of a movie, which might have at least an audio as well as a visual component. The speaker 206 may also include the capability to also produce a vibratory effect. However, in some instances, the purposeful production of vibrational effects may be associated with a separate element, not shown, which is internal to the device. Generally, the speaker 206 is located toward the top of the device, which corresponds to an orientation consistent with the respective portion of the device facing in an upward direction during usage in a portrait orientation in support of a voice communication. In such an instance, the speaker 206 might be intended to align with the ear of the user, and the microphone 208 might be intended to align with the mouth of the user. Also located near the top of the device, in the illustrated embodiment, is a front facing camera 210. The wireless communication device will also generally include one or more radio frequency transceivers, as well as associated transmit and receive circuitry, including one or more antennas that may be positioned internally relative to the device. In some instances, some or all of the antenna elements may also and/or alternatively be incorporated as part of the housing of the device.

The exemplary wireless communication device can further incorporate one or more controllers and/or data storage elements, which can help manage the overall operation of the device, including managing the overall operation of the wireless communication capabilities.

In the event that the user device 102, such as the wireless communication device 200 were to experience a non-standard use condition, such as a use condition which goes beyond the normal expected forms of regular operation, any of the various elements may experience damage or degradation that could impact the ongoing performance of the device. While regular degradation may occur over time, accelerated degradation/damage and/or a more instantaneous form of degradation/damage can often be linked to a particular event or instance of operation of the device that goes beyond the type of interactions that would normally be expected. It is after these detectable events, where it may be beneficial to run a diagnostic routine in addition to any other expected periodic performance of a same or similar form of diagnostic routine. It is possible that the particular type of diagnostic routine that might be triggered could be related to a particular type of non-standard use condition that might be detected.

However, while some elements after sustaining damage may exhibit a physical manifestation of damage that may be readily visible and apparent to a user, it is possible that some damage, that portions of a device might experience, may be beyond the ability of the user to readily visually detect. A diagnostic routine would preferably be able to measure the intended performance of the various elements of the device 102, to determine if any of the associated components have experienced a performance degradation that causes the ongoing performance of the component to fall below a predetermined acceptable level or threshold of performance. If the current threshold level of performance is determined to fall below a replacement threshold level, then the diagnostic routine may recommend a need for service of the user device to address the affected elements through a repair or a replacement of the same.

Figure 3:
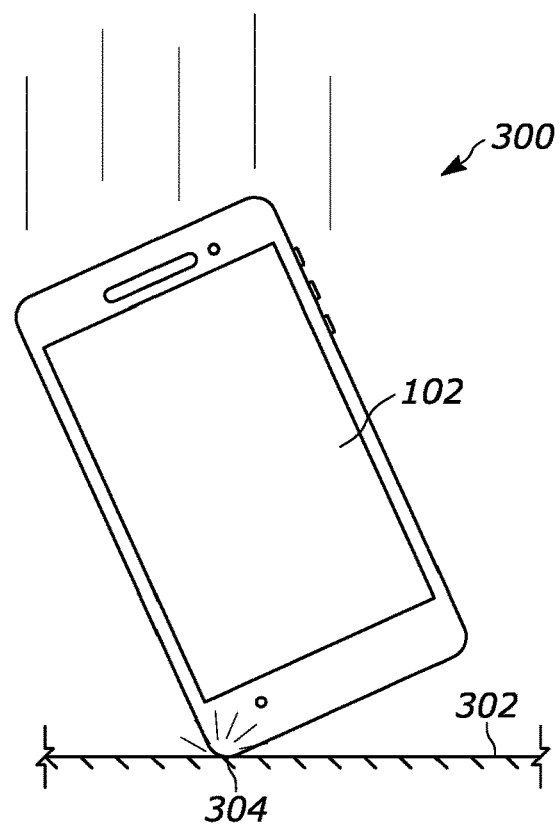
FIG. 3 is a line drawing of a graphical representation of an exemplary non-standard use condition including an impact from a fall.

FIG. 3 illustrates a line drawing 300 of a graphical representation of an exemplary non-standard use condition including an impact 304 with a surface 302 or another object from a fall. At least one study, suggests that approximately 38 percent of users/consumers at some point will drop their phone right out of their hand. In some instances, a user may lose their grip on the device as they attempt to retrieve the device from one's pocket or hand bag. It has been further estimated that 15 percent of people will break their phone by dropping it off of their lap. This can occur, when a user stands up after forgetting that their device was located on their lap.

During the drop, the device accelerates under the force of gravity, until it encounters and/or impacts another object or surface. The impact will sometimes result in a rather sudden de-acceleration of the device, which can produce a jarring impact. Depending upon the orientation of the device when it experiences the rather sudden de-acceleration, it is possible that the related forces may be more or less focused at one or more points along the surface of the device, which can affect the resulting, if any, damage. Manufacturer testing may be able to determine the type of damage that is reasonably likely to occur as a result of experiencing a fall, and the related eventual relatively sudden de-acceleration. The device may include one or more sensors that may alternatively be able to detect either or both of the fall and/or the subsequent impact.

Figure 4:
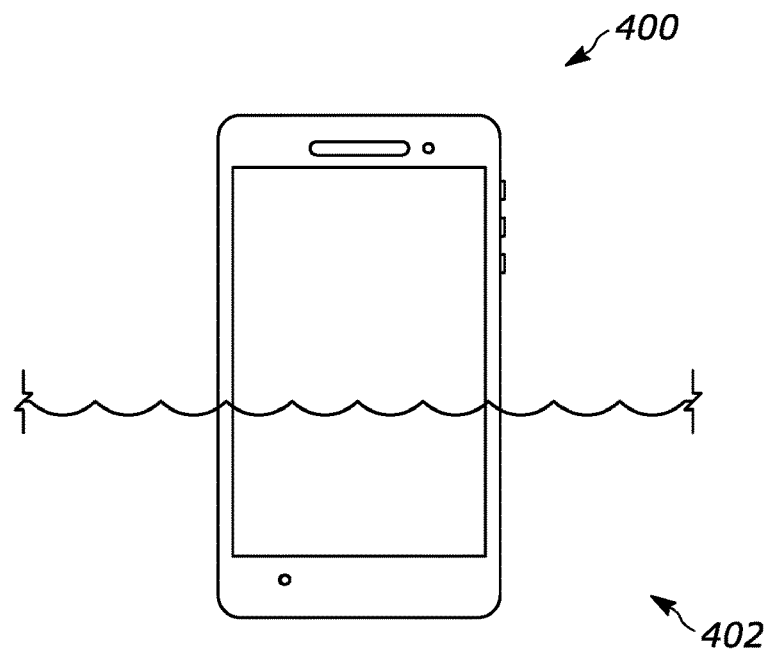
FIG. 4 is a line drawing of a graphical representation of an exemplary non-standard use condition including an immersion at least partly into a liquid.

In some instances, the device may fall into a body of water or other liquid. While the liquid may limit the resulting damage related to any impact with the surface of the liquid, the corresponding immersion of all or parts of the user device 102 into the liquid may allow some of the liquid to enter the device through one or more of the various openings in the housing, which might cause some of the internal electronic circuitry to be exposed to the liquid. In some instances, the liquid may be electrically conductive, which can cause one or more shorts in the electrical circuitry, which can allow unintended current paths that may exceed the safe operating levels for one or more of the components to occur. FIG. 4 illustrates a line drawing 400 of a graphical representation of an exemplary non-standard use condition including an immersion of a user device 102 at least partly into a liquid 402.

Figure 5:
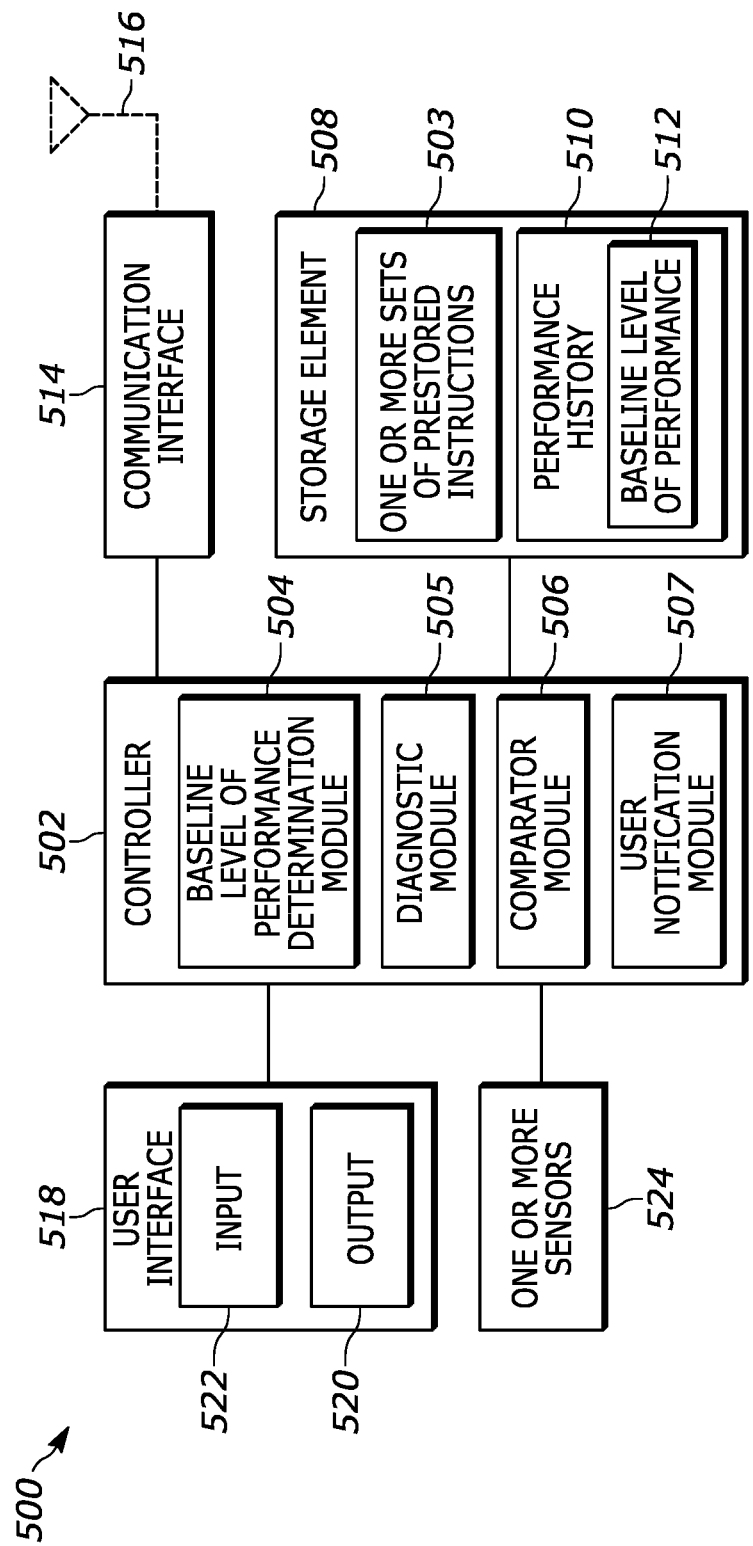
FIG. 5 is a block diagram of an exemplary user equipment, such as a wireless communication device.

FIG. 5 illustrates a block diagram 500 of an exemplary user equipment, such as a wireless communication device, in accordance with at least one embodiment. In the illustrated embodiment, the user equipment includes a controller 502, which is adapted for managing at least some of the operation of the device. In some embodiments, the controller 502 could be implemented in the form of one or more processors, which can each be adapted to execute one or more sets of pre-stored instructions 503, and which may be used to form or implement the operation of at least part of one or more controller modules including those used to determine 504 a baseline level of performance, perform diagnostics 505 to determine a current level of performance, compare 506 the current level of performance with the baseline level, and providing a user notification 507 in the event there is a determined need for service. The one or more sets of pre-stored instructions 503 may be stored in a storage element 508, which while shown as being separate from and coupled to the controller 502, may additionally or alternatively include some data storage capability for storing at least some of the prestored instructions 503 for use with the controller 502, that is integrated as part of the controller 502. The storage element can additionally include a performance history 510 for at least one element associated with the user equipment, as well as a baseline level of performance 512.

The storage element 508 could include one or more forms of volatile and/or non-volatile memory, including conventional ROM, EPROM, RAM, or EEPROM. The possible additional data storage capabilities may also include one or more forms of auxiliary storage, which is either fixed or removable, such as a hard drive, a floppy drive, or a memory card or stick. One skilled in the art will still further appreciate that still other further forms of storage elements could be used without departing from the teachings of the present disclosure. In the same or other instances, the controller 502 may additionally or alternatively incorporate state machines and/or logic circuitry, which can be used to implement at least partially, some of the modules and/or functionality associated with the controller 502 including all or portions of the claimed methods.

In the illustrated embodiment, the device can further include a communication interface 514, which in at least some instances can include one or more transceivers, transmitters or receivers, which can be coupled to the controller 502 and which serves to manage the external communication of data including their wireless communication using one or more forms of communications. In such an instance, the one or more transceivers, transmitters or receivers will each generally be coupled to one or more antennas 516, via which the wireless communication signals will be radiated and/or received. In at least some instances, the one or more transceivers, transmitters or receivers could be coupled to the one or more antennas 516 via front end circuitry included as part of the communication interface 514.

The front end circuitry can often include various subelements, such as power amplifiers, filters, diplexers, duplexers and switches, which help to facilitate the coupling of a produced signal to an antenna. The front end circuitry can further include impedance matching elements, antenna tuners, and/or additional signal amplifiers, so as to more effectively manage the conveyance of signals between the one or more transceivers, transmitters or receivers of the communication interface, and the antenna elements 516.

In the illustrated embodiment, the device can additionally include user interface circuitry 518, some of which can be associated with producing an output 520 to be perceived by the user, and some of which can be associated with detecting an input 522 from the user. For example, the user interface circuitry 518 can include a display 202 adapted for producing a visually perceptible output, which may further support a touch sensitive array for receiving an input from the user. The user interface circuitry may also include a speaker 206 for producing an audio output, and a microphone 208 for receiving an audio input. The user interface output 520 could further include a vibrational element. The user interface input 522 could further include one or more user actuatable switches 204, as well as one or more cameras 210. Still further alternative and additional forms of user interface elements may be possible.

In the illustrated embodiment, the device can still further include one or more sensors 524, which can be used for gathering status information relative to the operating environment as well as the manner in which the device is being used. For example, the one or more sensors 524 can potentially sense one or more non-standard use conditions to which the user equipment is being exposed. The one or more sensors 524 can include various tilt sensors, moisture sensors, accelerometers, gyroscopes, camera sensors, compass, temperature sensors, touch sensors, infrared emitter/receivers, capacitive sensors, and/or proximity sensors, which the device can use to detect the exposure of the device to one or more types of non-standard use conditions. In turn, this information can be used to help determine if a diagnostic determination should be triggered. The use of still further types of sensors are possible in identifying use conditions or modes of operation without departing from the teachings of the present application.

As part of triggering a diagnostic, the diagnostic module 505 may prompt the user to initiate a diagnostic program. Alternatively, the diagnostic module 505 may be capable of initiating a diagnostic program without user intervention. The results of the diagnostic could be compared with the stored performance history 510, which can include an expected baseline level of performance 512. Furthermore, the results of the diagnostic could be used to update the stored performance history 510.

In addition to and/or alternative to referencing locally stored performance history, the user equipment could interact with one or more servers to send or receive related information. Because the performance of the circuitry related with interacting with the network or a server, may have been compromised as part of the detected non-standard use condition, it may be beneficial to have an internally and/or locally available version of the information, which can include a performance history, as well as an expected baseline level of performance for one or more elements of the user equipment/device.

Upon determination of the integrity of the one or more elements, if any of the elements are determined as being in need of repair or replacement, the user equipment can attempt to contact one or more service centers to schedule a service appointment. As part of scheduling a service appointment, the device can confirm whether one or more anticipated as being needed replacement parts will be available at the time of the scheduled appointment, if it turns out to in fact be needed. The various service centers may make use of blockchain technology in managing the available inventory of replacement parts. Additionally and/or alternatively blockchain technology could be used to maintain a performance history, as well as an expected baseline level of performance for the various sub-elements of the device.

The performance history could be maintained for each element of the device, and can be determined through an analysis of the previously performed diagnostics relative to a particular user device. The stored performance history may also include previous diagnostics related information for other devices of the same or similar type, make or model. Still further, the stored performance history may also include previous diagnostics related information for other related elements regardless of the type, make or model of the device in which the particular type of element is used. By aggregating the information across multiple devices, the expected baseline level of performance for each of the elements, as well as its relationship to the present need for service, may be improved.

The available performance history and expected baseline level of performance can be supplemented with diagnostic results from a periodic diagnostic determination including those that may not have been necessarily triggered by any detected non-standard use condition. In the event that no problems have been detected, the user device can inform the user, so that the user is aware of the current belief that the current operation of the device has not been compromised.

Figure 6:
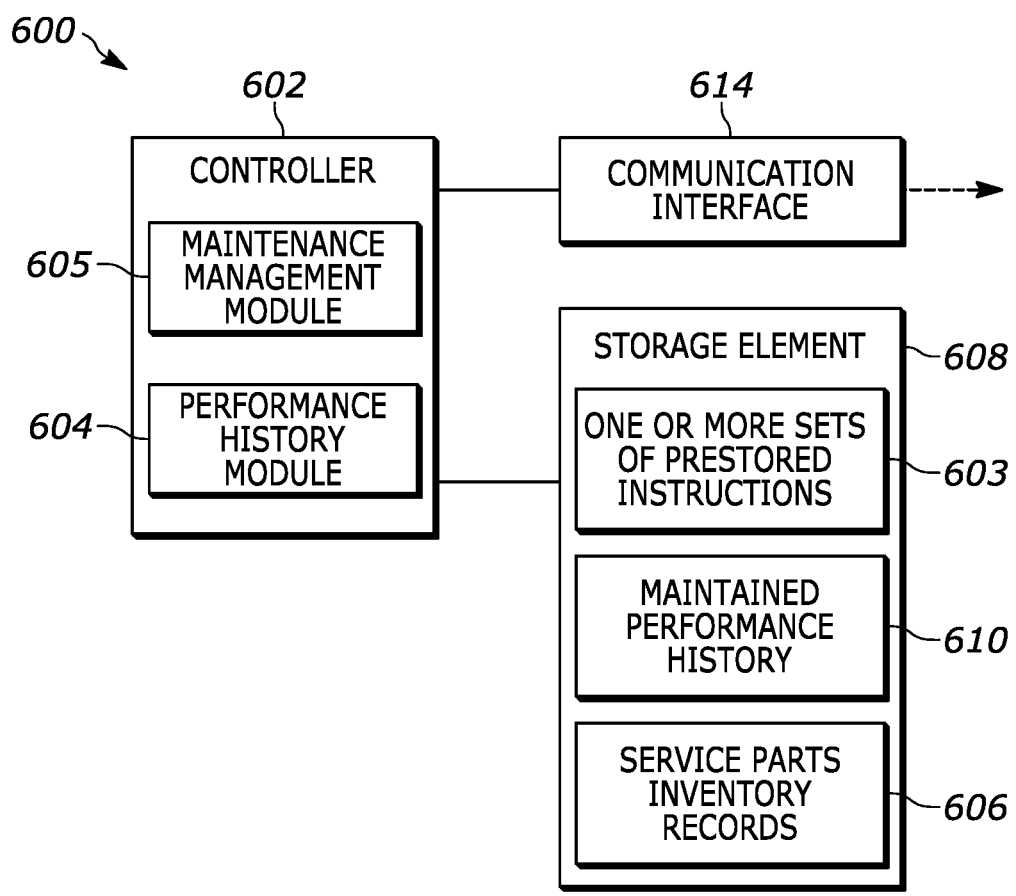
FIG. 6 is a block diagram of an exemplary network server for use in connection with monitoring a use condition, which might be used to provide maintenance management and/or might be used to maintain a performance history.

FIG. 6 illustrates a block diagram 600 of an exemplary network server for use in connection with monitoring a use condition, which might be used to provide maintenance management and/or might be used to maintain a performance history.

In the illustrated embodiment, the network server can similarly include a controller 602, which is adapted for managing at least some of the operation of the server. In some embodiments, the controller 602 could be implemented in the form of one or more processors, which can each be adapted to execute one or more sets of pre-stored instructions 603, and which may be used to form or implement the operation of at least part of one or more controller modules including those used to maintain a performance history 604, and/or manage the maintenance process 605 including maintaining a service parts inventory 606. The one or more sets of pre-stored instructions 603 may be stored in a storage element 608, which while shown as being separate from and coupled to the controller 602, may additionally or alternatively include some data storage capability for storing at least some of the prestored instructions 603 for use with the controller 602, that is integrated as part of the controller 602. The storage element 608 can additionally include a maintained performance history 610 for at least one element associated with the user equipment 500, including a baseline level of performance, as well as service parts inventory records 606.

The storage element 608 could similarly include one or more forms of volatile and/or non-volatile memory, including conventional ROM, EPROM, RAM, or EEPROM. The possible additional data storage capabilities may also include one or more forms of auxiliary storage, which is either fixed or removable, such as a hard drive, a floppy drive, or a memory card or stick. One skilled in the art will still further appreciate that still other further forms of storage elements could be used without departing from the teachings of the present disclosure. In the same or other instances, the controller 602 may additionally or alternatively incorporate state machines and/or logic circuitry, which can be used to implement at least partially, some of the modules and/or functionality associated with the controller 602 including all or portions of the claimed methods.

In the illustrated embodiment, the device can further include a communication interface 614, which in at least some instances can include one or more transceivers, transmitters or receivers, which can be coupled to the controller 602 and which serves to manage the external communication of data including their potential wired or wireless communication using one or more forms of communications. In some instances, the one or more transceivers, transmitters or receivers may be coupled to one or more antennas, via which wireless communication signals may be radiated and/or received. In some instances, the servers may be integrated as part of the one or more base stations 104.

Figure 7:
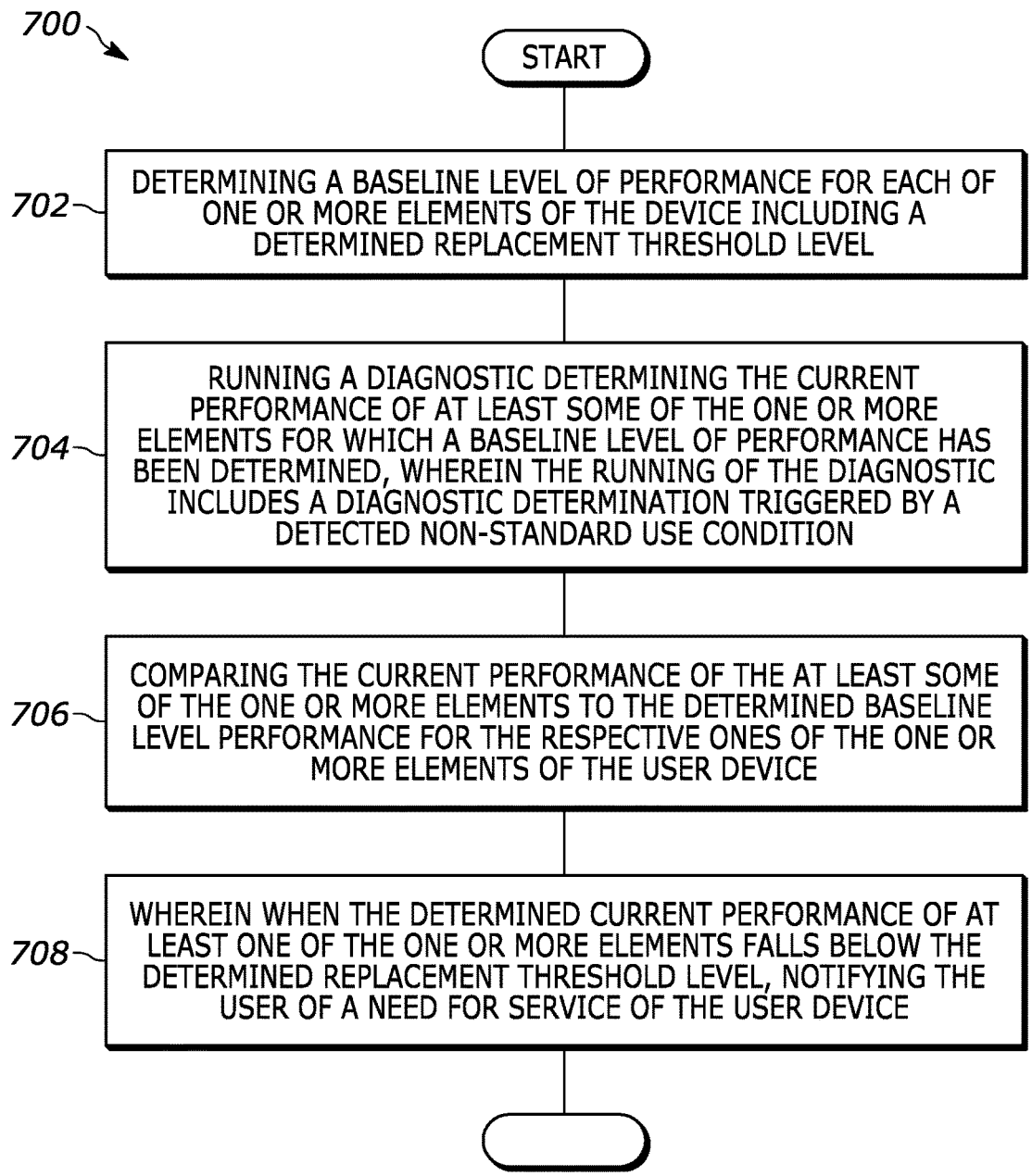
FIG. 7 is a flow diagram for monitoring a use condition.

FIG. 7 illustrates a flow diagram 700 for a method for monitoring a use condition in a user equipment. The method can include determining 702 a baseline level of performance for each of one or more elements of the device including a determined replacement threshold level. The method further includes running 704 a diagnostic determining the current performance of at least some of the one or more elements for which a baseline level of performance has been determined, wherein the running of the diagnostic includes a diagnostic determination triggered by a detected non-standard use condition. The current performance of the at least some of the one or more elements is compared 706 to the determined baseline level performance for the respective ones of the one or more elements of the user device. When the determined current performance of at least one of the one or more elements falls below the determined replacement threshold level, the user is notified of a need for service of the user device 708.

In at least some instances, the non-standard use condition can include a detected impact of the device against a surface and/or another object. As part of detecting such an impact, a sudden deceleration of the device may be detected.

In at least some instance, the non-standard use condition can include a detected immersion of at least part of the device into a liquid, such as water.

In at least some instances, the detected non-standard use condition can be determined by monitoring one or more sensors. In some instances, in addition to running the diagnostic triggered by a detected non-standard use condition, the running of the diagnostic is triggered to occur periodically. In some instances, running a diagnostic can include the user device prompting the user to initiate the running of the diagnostic. In some instances, a diagnostic program can be automatically initiated by the user device, such as in response to a detected non-standard use condition.

In at least some instances, determining a baseline level of performance can include a maintained performance history of at least some of the one or more elements. In some instances, the maintained performance history may be stored using blockchain technology. In some instances, the baseline level of performance is maintained for the one or more elements of a particular device. In some instances, the baseline level of performance is maintained for one or more elements of one or more devices of a particular type. In some instances, the baseline level of performance is maintained for each of a particular type of element independent of a particular type of device in which the particular type of element is used.

In at least some instances, the method can further include communicating with a service center for managing the service of the user device. In some instances, communicating with the service center can include identifying elements needing to be replaced. In some instances, communicating with the service center can include confirming the availability of replacement parts or elements at the service center. In some instances, communicating with the service center can include scheduling a service appointment.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 8:
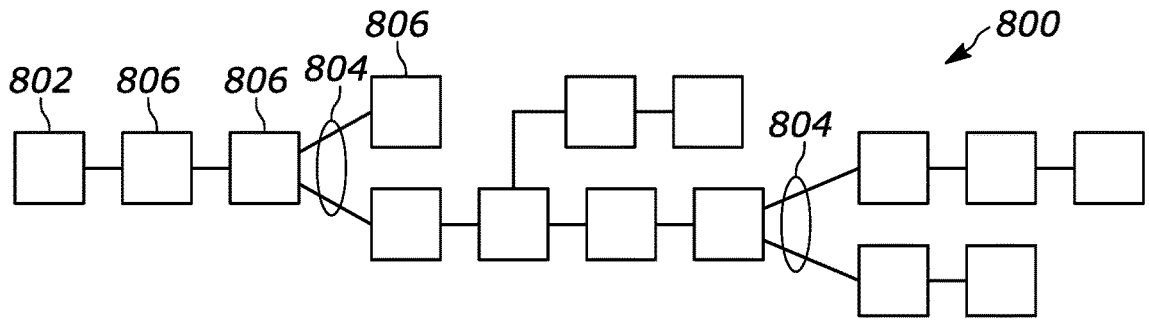
FIG. 8 is a block diagram of an exemplary blockchain.

FIG. 8 illustrates a block diagram of an exemplary blockchain 800. In general, a blockchain can include one or more records 806, as part of a potentially growing list of records. Each record is sometimes referred to as a block, where each block in the chain can include a cryptographic hash of the previous block, a time stamp, and transaction data.

The blockchain can be managed by multiple users in a peer-to-peer fashion, where individual users can each append data to an existing chain, which then gets replicated as part of multiple copies of the chain of records that are maintained across a network. Because of this, it is possible that any particular chain can sometimes include multiple branches 804 and/or forks that develop as part of the overall stored structure. A main chain is generally associated with the longest series of blocks from a genesis block 802, which identifies the beginning of a particular chain.

When needed, data from the record can be aggregated by parsing the linked elements to determine the information, which is currently of interest. The information can be updated by appending a new linked record. In this way, it may be possible for multiple users to simultaneously update in real time information related to a particular type of information.

In at least the present embodiment, it may be possible for blockchain technology to be used to maintain a current indication of the spare parts inventory at the various service centers that are available in providing service relative to a particular device. It may also be possible to use blockchain technology in maintaining information relative to an expected baseline level of performance for one or more of the associated elements of a device.

By better managing the determined health of a device both before and after an event that has a higher likelihood of impacting the future performance of a particular device, it may be possible to provide the user with an improved level of feedback as to the current operational status of the device. This information could then be used to provide more timely alerts as to the potential need for service, as well as to more proactively schedule the appointment in such a way as to attempt to reduce any associated inconvenience, such as by helping to insure that the potentially needed replacement parts are available to reduce the need for any return service visits. Furthermore, the information learned through the more targeted gathering of performance data may help to better predict future hardware failures, and help to provide for possibly improved warranty solutions.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for monitoring a condition of a user device, the method comprising:
   determining a baseline level of performance for each of one or more elements of the device including a determined replacement threshold level;
   triggering a running of a diagnostic in addition to an expected periodic diagnostic, which determines the current performance of at least some of the one or more elements for which a baseline level of performance has been determined, wherein the running of the diagnostic in addition to the expected periodic diagnostic includes a diagnostic determination triggered by a detected non-standard use condition; and
   comparing the current performance of the at least some of the one or more elements to the determined baseline level performance for the respective ones of the one or more elements of the user device; and
   wherein when the determined current performance of at least one of the one or more elements falls below the determined replacement threshold level, notifying the user of a need for service of the user device.

2. A method in accordance with claim 1, wherein the non-standard use condition includes a detected impact of the device against a surface.

3. A method in accordance with claim 2, wherein the detected impact includes a detected sudden deceleration of the device.

4. A method in accordance with claim 1, wherein the non-standard use condition includes a detected immersion in water.

5. A method in accordance with claim 1, wherein the detected non-standard use condition is determined by monitoring one or more sensors.

6. A method in accordance with claim 1, where in addition to running the diagnostic triggered by the detected non-standard use condition, a running of a diagnostic is triggered to occur periodically.

7. A method in accordance with claim 1, wherein running a diagnostic includes a diagnostic program initiated by the user after being prompted by the user device to do so.

8. A method in accordance with claim 1, wherein running a diagnostic includes a diagnostic program that is automatically initiated by the user device.

9. A method in accordance with claim 1, wherein determining a baseline level of performance includes a maintained performance history of at least some of the one or more elements.

10. A method in accordance with claim 9, wherein the maintained performance history is stored using blockchain technology.

11. A method in accordance with claim 9, wherein the baseline level of performance is maintained for the one or more elements of a particular device.

12. A method in accordance with claim 9, wherein the baseline level of performance is maintained for the one or more elements of one or more devices of a particular type.

13. A method in accordance with claim 9, wherein the baseline level of performance is maintained for each of a particular type of element independent of a particular type of device in which the particular type of element is used.

14. A method in accordance with claim 1, wherein the method further comprises communicating with the service center for managing the service of the user device.

15. A method in accordance with claim 14, wherein communicating with the service center includes identifying elements needing to be replaced.

16. A method in accordance with claim 14, wherein communicating with the service center includes confirming availability of replacement elements at the service center.

17. A method in accordance with claim 14, wherein communicating with the service center includes scheduling a service appointment.

18. A user device comprising:
one or more sensors; and
a controller, the controller including
 a baseline level of performance determination module adapted for determining a baseline level of performance for each of one or more elements of the device including a determined replacement threshold level;
 a diagnostic module adapted for triggering a running of a diagnostic in addition to an expected periodic diagnostic, which determines the current performance of at least some of the one or more elements for which a baseline level of performance has been determined, wherein the running of the diagnostic in addition to the expected periodic diagnostic includes a diagnostic determination triggered by a detected non-standard use condition by a non-standard use condition detection module;
 a comparator module adapted for comparing the current performance of the at least some of the one or more elements to the determined baseline level performance for the respective ones of the one or more elements of the user device; and
 a user notification module adapted for notifying the user of a need for service of the user device, when the determined current performance of at least one of the one or more elements falls below the determined replacement threshold level.

19. A user device in accordance with claim 18, wherein the one or more sensors detect the present performance of a particular element.

20. A user device in accordance with claim 18, wherein the one or more sensors detect the usage of the user device.

* * * * *